United States Patent
Ai et al.

(10) Patent No.: US 12,401,989 B2
(45) Date of Patent: Aug. 26, 2025

(54) METHOD FOR SYSTEM INFORMATION TRANSMISSION

(71) Applicant: ZTE CORPORATION, Guangdong (CN)

(72) Inventors: Jianxun Ai, Shenzhen (CN); Bo Dai, Shenzhen (CN); Xiubin Sha, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 309 days.

(21) Appl. No.: 17/870,736

(22) Filed: Jul. 21, 2022

(65) Prior Publication Data

US 2023/0008141 A1 Jan. 12, 2023

Related U.S. Application Data

(63) Continuation of application No. PCT/CN2020/073868, filed on Jan. 22, 2020.

(51) Int. Cl.
*H04W 8/24* (2009.01)
*H04L 69/24* (2022.01)

(52) U.S. Cl.
CPC ............... *H04W 8/24* (2013.01); *H04L 69/24* (2013.01)

(58) Field of Classification Search
CPC ...... H04W 8/22; H04W 8/24; H04L 47/2408; H04L 47/72; H04L 49/20; H04L 65/00; H04L 65/40; H04L 67/00; H04L 67/141; H04L 69/24
See application file for complete search history.

(56) References Cited

U.S. PATENT DOCUMENTS

| | | | |
|---|---|---|---|
| 2016/0150419 A1 | 5/2016 | Thangarasa et al. | |
| 2017/0164378 A1* | 6/2017 | Gunasekara | H04W 4/08 |
| 2017/0373902 A1* | 12/2017 | Zhang | H04L 5/0092 |
| 2019/0141773 A1* | 5/2019 | Kim | H04W 76/34 |
| 2020/0351639 A1* | 11/2020 | Shrivastava | H04W 4/06 |
| 2020/0359286 A1* | 11/2020 | Tang | H04W 8/24 |
| 2021/0204112 A1* | 7/2021 | Kim | H04W 8/24 |
| 2021/0227451 A1* | 7/2021 | Babaei | H04W 76/27 |
| 2022/0210724 A1* | 6/2022 | Mildh | H04W 48/18 |

(Continued)

FOREIGN PATENT DOCUMENTS

| | | |
|---|---|---|
| CN | 107006002 A | 8/2017 |
| CN | 109309914 A | 2/2019 |

(Continued)

OTHER PUBLICATIONS

Ericsson, "Introduction of FeMBMS to 36.331" 3GPP TSG-RAN WG2 Meeting #97, R2-1702419, Feb. 17, 2017, Athens, Greece (27 pages).

(Continued)

*Primary Examiner* — Warner Wong
(74) *Attorney, Agent, or Firm* — Foley & Lardner LLP

(57) ABSTRACT

Method, systems and devices for transmitting system information in a wireless communication system are disclosed. The wireless communication method comprises transmitting a specific information associated with system information, SI, related to a first wireless terminal in a cell, wherein the SI related to the first wireless terminal comprise an instance different from the instance the SI related to a second wireless terminal.

8 Claims, 2 Drawing Sheets

(56) References Cited

U.S. PATENT DOCUMENTS

| | | | |
|---|---|---|---|
| 2022/0338216 A1* | 10/2022 | Fei | H04W 48/12 |
| 2023/0007524 A1* | 1/2023 | Wang | H04L 5/0091 |
| 2023/0038753 A1* | 2/2023 | Tan | H04W 74/0841 |

FOREIGN PATENT DOCUMENTS

| | | | | |
|---|---|---|---|---|
| CN | 109417746 A | 3/2019 | | |
| EP | 3 079 409 A1 | 10/2016 | | |
| EP | 3 446 515 | 2/2019 | | |
| WO | WO-2016/163071 A1 | 10/2016 | | |
| WO | WO-2017050184 A1 * | 3/2017 | | H04W 24/02 |
| WO | WO-2017/184842 A1 | 10/2017 | | |

OTHER PUBLICATIONS

International Search Report and Written Opinion for PCT Appl. No. PCT/CN2020/073868, mailed Oct. 28, 2020 (7 pages).
Extended European Search Report for EP Appl. No. 20887219.2, dated Apr. 26, 2023.
Communication pursuant to Article 94(3) EPC for EP App. No. 20887219.2 dated Oct. 29, 2024 (12 pages).
Office Action for CN Appl. No. 202211574581.0 dated Apr. 26, 2025 (1 page).

* cited by examiner

METHOD FOR SYSTEM INFORMATION TRANSMISSION

CROSS-REFERENCE TO RELATED APPLICATION

This application claims the benefit of priority under 35 U.S.C. § 120 as a continuation of PCT Patent Application No. PCT/CN2020/073868, filed on Jan. 22, 2020, the disclosure of which is incorporated herein by reference in its entirety.

TECHNICAL FIELD

This document is directed generally to wireless communications.

SUMMARY

In order to support radio access of industrial sensors, smart wearable and video surveillance, etc, low cost and low complexity or reduced capability devices are introduced on the top of current radio access technology. The reduced capability device has limited downlink bandwidth capability to save device cost. However, current radio access systems, e.g. 5G radio access technology (i.e. new radio (NR)), are originally designed for normal devices which support larger downlink bandwidth and may not be able to support reduced capability devices.

This document relates to methods, systems, and devices for transmitting system information in a wireless communication system, and more particularly for transmitting system information supporting a reduced capability device in a wireless communication system.

The present disclosure relates to a wireless communication method for use in a wireless network node. The wireless communication method comprises:
transmitting a specific information associated with system information, SI, related to a first wireless terminal in a cell,
wherein the SI related to the first wireless terminal comprises an instance different from an instance of SI related to a second wireless terminal.

Various embodiments may preferably implement the following features:

Preferably, a capability of downlink, DL, bandwidth of the first wireless terminal is smaller than the capability of the DL bandwidth of the second wireless terminal.

Preferably, the first wireless terminal is a bandwidth reduced user equipment, UE.

Preferably, the first wireless terminal works in an extended coverage.

Preferably, the first wireless terminal works in a coverage enhancement mode.

Preferably, the SI comprises at least one of master information block, MIB, SI block 1, SIB1, an SI message or an information element of the SI related to the first wireless terminal.

Preferably, the SI related to the first wireless terminal comprises at least one of the SI dedicated to the first wireless terminal or the SI applicable to the first wireless terminal and the second wireless terminal.

Preferably, the specific information comprises the SI related to the first wireless terminal.

Preferably, the wireless communication further comprises:
scheduling the specific information by an identifier configured for the first wireless terminal,
wherein the identifier configured for the first wireless terminal is different from the identifier configured for the second wireless terminal.

Preferably, the identifier is an SI radio network temporary identifier, SI-RNTI.

Preferably, the specific information is scheduled by a configuration used for scheduling the SI of the second wireless terminal.

Preferably, the specific information is scheduled on a resource which is different from the resource used for scheduling the SI of the second wireless terminal.

Preferably, the resource used for scheduling the specific information is configured by SIB1 which is dedicated for the first wireless terminal or applicable to the first wireless terminal and the second wireless terminal.

Preferably, the specific information is transmitted by:
transmitting first partial information dedicated for the first wireless terminal; and
transmitting second partial information applicable to the first wireless terminal and the second wireless terminal, and
wherein the specific information is determined based on the first partial information and the second partial information.

Preferably, the first partial information and the second partial information are scheduled by different resources.

Preferably, the first partial information and the second partial information are scheduled by different SI-RNTIs.

Preferably, the specific information comprises a first indicator indicating whether the cell supports the first wireless terminal.

Preferably, the first indicator is included in master information block, MIB, of the cell.

Preferably, the first indicator indicates whether the cell supports the first wireless terminal by indicating whether the SI related to the first wireless terminal is transmitted in the cell or a configuration dedicated for the first wireless terminal is configured in the cell.

Preferably, the first indicator is included in DL control information, DCI, of the cell.

Preferably, the first indicator indicates whether the cell supports the first wireless terminal by indicating whether the SI dedicated for the first wireless terminal is transmitted in the cell.

Preferably, a resource on which the first indicator is transmitted is used for transmitting one of the SI dedicated for the first wireless terminal, the SI dedicated for the second wireless terminal or the SI applicable to the first wireless terminal and the second wireless terminal.

Preferably, the first indicator is transmitted by a physical signal in the cell.

Preferably, the specific information comprises a second indicator indicating whether the SI related to the first wireless terminal is changed.

Preferably, the second indicator indicates whether the SI related to the first wireless terminal is changed over an SI valid time.

Preferably, the second indicator is included in DCI scheduling SIB1 related to at least one of the first wireless terminal or the second wireless terminal.

Preferably, the second indicator is a first value tag in DCI scheduling SIB1 related to at least one of the first wireless terminal or the second wireless terminal.

Preferably, the second indicator indicates the SI related to the first wireless terminal is changed and the wireless communication method further comprises:
transmitting the SI related to the first wireless terminal.

Preferably, the specific information comprises a second value tag corresponding to an SIB in the SI related to the first wireless terminal.

Preferably, the second value tag changes when the corresponding SIB related to the first wireless terminal changes.

Preferably, the second value tag is in SIB1 of the SI related to the first wireless terminal.

Preferably, the specific information comprises a change notification indicating the SI related to the first wireless terminal is to be changed and the change notification is comprised in a paging message or DCI used to schedule the paging message or a DCI scrambled with a paging-RNTI, P-RNTI.

Preferably, the specific information comprises an area identification in the SI related to the first wireless terminal and the area identification indicates a valid area of the SI related to the first wireless terminal.

The present disclosure relates to a wireless communication method for use in a wireless terminal. The wireless communication method comprises:
receiving a specific information associated with system information, SI, related to a first wireless terminal in a cell,
wherein the SI related to the first wireless terminal comprises an instance different from an instance of SI related to a second wireless terminal.

Various embodiments may preferably implement the following features:

Preferably, a capability of downlink, DL, bandwidth of the first wireless terminal is smaller than the capability of the DL bandwidth of the second wireless terminal.

Preferably, the first wireless terminal is a bandwidth reduced user equipment, UE.

Preferably, the first wireless terminal works in an extending coverage.

Preferably, the first wireless terminal works in a coverage enhancement mode.

Preferably, the SI comprises at least one of master information block, MIB, SI block 1, SIB1, an SI message or an information element of the SI related to the first wireless terminal.

Preferably, the SI comprises at least one of the SI related to the first wireless terminal dedicated to the first wireless terminal or the SI applicable to the first wireless terminal and the second wireless terminal.

Preferably, the specific information comprises the SI related to the first wireless terminal.

Preferably, the wireless communication method further comprises:
determining the specific information by using an identifier configured for the first wireless terminal,
wherein the identifier configured for the first wireless terminal is different from the identifier configured for the second wireless terminal.

Preferably, the identifier is an SI radio network temporary identifier, SI-RNTI.

Preferably, the specific information is scheduled by a configuration used for scheduling the SI of the second wireless terminal.

Preferably, the specific information is scheduled on a resource which is different from the resource used for scheduling the SI of the second wireless terminal.

Preferably, the resource used for scheduling the specific information is configured by SIB1 which is dedicated for the first wireless terminal or applicable to the first wireless terminal and the second wireless terminal.

Preferably, the specific information is received by:
receiving first partial information dedicated for the first wireless terminal;
receiving second partial information applicable to the first wireless terminal and the second wireless terminal, and
determining the specific information based on the first partial information and the second partial information.

Preferably, the first partial information and the second partial information are scheduled by different resources.

Preferably, the first partial information and the second partial information are scheduled by different SI-RNTIs.

Preferably, the specific information comprises a first indicator indicating whether the cell supports the first wireless terminal.

Preferably, the first indicator is included in master information block, MIB, of the cell.

Preferably, the first indicator indicates whether the cell supports the first wireless terminal by indicating whether the SI related to the first wireless terminal is transmitted in the cell or a configuration dedicated for the first wireless terminal is configured in the cell.

Preferably, the first indicator is included in DL control information, DCI, of the cell.

Preferably, the first indicator indicates whether the cell supports the first wireless terminal by indicating whether the SI dedicated for the first wireless terminal is transmitted in the cell.

Preferably, a resource in which the first indicator is included is used for transmitting one of the SI dedicated for the first wireless terminal, the SI dedicated for the second wireless terminal or the SI applicable to the first wireless terminal and the second wireless terminal.

Preferably, the first indicator is transmitted by a physical signal in the cell.

Preferably, the specific information comprises a second indicator indicating whether the SI related to the first wireless terminal is changed.

Preferably, the second indicator indicates whether the SI related to the first wireless terminal is changed over an SI valid time.

Preferably, the second indicator is included in DCI scheduling SIB1 related to at least one of the first wireless terminal or the second wireless terminal.

Preferably, the second indicator is a first value tag in DCI scheduling SIB1 related to at least one of the first wireless terminal or the second wireless terminal.

Preferably, the second indicator indicates the SI related to the first wireless terminal is changed and the wireless communication method further comprises:
transmitting the SI related to the first wireless terminal.

Preferably, the specific information comprises a second value tag corresponding to an SIB in the SI related to the first wireless terminal.

Preferably, the second value tag changes when the corresponding SIB related to the first wireless terminal changes.

Preferably, the second value tag is in SIB1 of the SI related to the first wireless terminal.

Preferably, the specific information comprises a change notification indicating the SI related to the first wireless terminal is to be changed and the change notification is comprised in one of a paging message, DCI used to schedule the paging message or DCI scrambled with a paging-RNTI, P-RNTI.

Preferably, the specific information comprises an area identification in the SI related to the first wireless terminal and the area identification indicates a valid area of the SI related to the first wireless terminal.

The present disclosure relates to a wireless network node. The wireless network node comprises a communication unit, configured to transmit a specific information associated with system information, SI, related to a first wireless terminal in a cell, wherein the SI related to the first wireless terminal comprises an instance different from an instance of SI related to a second wireless terminal.

Various embodiments may preferably implement the following feature:

Preferably, the wireless network node further comprises a processor configured to perform a wireless communication method of any of the foregoing described methods.

The present disclosure relates to a wireless terminal. The wireless terminal comprises a communication unit, configured to receive a specific information associated with system information, SI, related to a first wireless terminal in a cell, wherein the SI related to the first wireless terminal comprises an instance different from an instance of SI related to a second wireless terminal.

Various embodiments may preferably implement the following feature:

Preferably, the wireless terminal further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
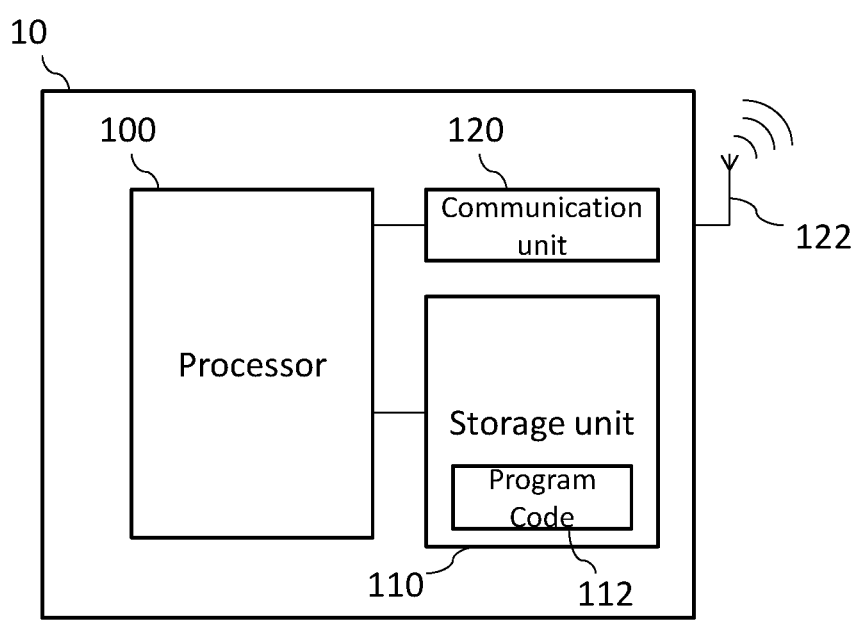
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
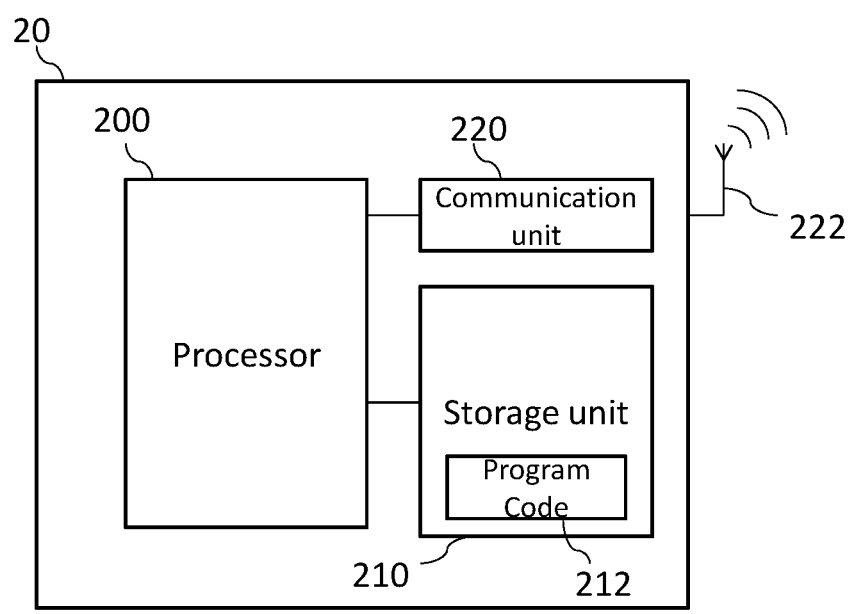
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to an SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In this disclosure, a type 1 UE refers to a low complexity and low cost UE (e.g. a reduced capability UE) and a type 2 UE refers to a normal UE (i.e. the UE without capability reduced).

In an embodiment, a capability of downlink, DL, bandwidth of the type 1 UE is smaller than the capability of the DL bandwidth of the type 2 UE.

In an embodiment, the type 1 UE is a bandwidth reduced UE.

In an embodiment, the type 1 UE works in an extended coverage.

In an embodiment, the type 1 UE works in a coverage enhancement mode.

In an embodiment, system information (SI) of a cell includes master information block (MIB), system information block 1 (SIB1), other SI messages and/or an information element (IE) of the SI.

In an embodiment, the MIB may be scheduled periodically in a synchronization signal (SS) and physical broadcast channel (PBCH) block (SSB). In an embodiment, the MIB includes parameters that are needed to acquire the SIB1 from the cell. In an embodiment, the MIB includes a physical DL control channel (PDCCH) configuration which is used for scheduling the transmission of the SIB1. In an embodiment, the PDCCH configuration includes a control resource set (CORESET) and a search space configuration.

In an embodiment, The SIB1 may be transmitted on a physical DL shared channel (PDSCH). The base station (BS) may schedule the SIB1 by transmitting DL control information (DCI) which contains signaling radio bearer 1 (SRB1) scheduling information. The DCI is transmitted on PDCCH occasions and scrambled with an SI-radio network-temporary-identifier (SI-RNTI). The PDCCH occasion is configured by the PDCCH configuration in the MIB. The value of the SI-RNTI is defined by specification. Thus, a UE acknowledges the value of the SI-RNTI before acquiring the SIB1.

In an embodiment, an SI message may contain one or multiple SIBs other than the SIB1. In an embodiment, an SI message is scheduled periodically according to its periodicity. In an embodiment, an SI message is scheduled within an SI window. The DCI which is used to schedule the SI message is scrambled by the SI-RNTI. The periodicity, the SI window and the SIB to SI mapping information are contained in the SIB1. The SIB1 may contain the PDCCH configuration for SI message scheduling.

Because the type 1 UE may support only limited DL bandwidth when comparing with the type 2 UE, the SI content and scheduling method designed for the type 2 UE may not be directly reusable for the type 1 UE. To support the type 1 UE access and communication in the cell, type 1 UE specific SI content and/or scheduling method is needed.

In an embodiment, SI for type 1 UE may comprise an instance of MIB, SIB1, SIB other than SIB1, or SI message different to that for type 2 UE.

In an embodiment, SI for type 1 UE may comprise an instance of information element in SIB1 or SIB other than SIB1.

In an embodiment, scheduling and transmission of the SI which is specific for the type 1 UE shall be a topic to be discussed.

In an embodiment, type 1 UE specific SIB1 and/or SI message (i.e. the SIB1 and/or SI message dedicated for the type 1 UE) may be scheduled with a type 1 UE specific SI-RNTI (i.e. the SI-RNTI configured for the type 1 UE).

In an embodiment, the type 1 UE specific SIB1 and/or SI message is scheduled by the type 1 UE specific SI-RNTI which is different from an SI-RNTI used to schedule type 2 UE specific SIB1 and/or SI message (i.e. the SI-RNTI configured for the type 2 UE).

In an embodiment, the type 1 UE specific SI-RNTI is defined by specification, or signaled by a BS via the MIB or the SIB1 to the UE.

In an embodiment, the type 1 UE specific SIB1 may be scheduled with same PDCCH configurations as those for scheduling the type 2 UE SIB1, e.g. the PDCCH configuration contained in the MIB of the cell.

In an embodiment, the type 1 UE specific SI message may be scheduled with same PDCCH configurations as those for the type 2 UE specific other SI message, e.g. the PDCCH configuration for other SI scheduling which is configured in the SIB 1.

As a result, the type 1 UE specific SIB1 and/or SI message can be scheduled with the same PDCCH occasions, the same periodicity and the same SI-window as those for the type 2 UE. In an embodiment, the type 1 UE acquires the type 1 UE specific SIB1 and/or SI message by decoding the type 1 UE specific SI-RNTI. On the other hand, the type 2 UE does not decode the type 1 UE specific SI-RNTI.

In an embodiment, the type 1 UE specific SI message is scheduled with different PDCCH occasions.

In an embodiment, the type 1 UE specific SI message is scheduled by the DCI which is transmitted on the type 1 UE SI message specific PDCCH occasions which may be different to the PDCCH occasions for the type 2 UE SI message.

In an embodiment, the type 1 UE specific SI message PDCCH occasions may be configured in the SIB1, which may be the same SIB1 for the type 2 UE. In the SIB1, the BS configures the type 1 UE specific SI message PDCCH occasions by including at least one of a CORSET configuration or a search space configuration other than those for type 2 UE. In other words, the type 1 UE specific SI message PDCCH occasions and the type 2 UE specific SI message PDCCH occasions may be configured by separate configuration IEs.

In an embodiment, the type 1 UE specific SI message PDCCH occasions may be configured in the SIB1 dedicated for the type 1 UE. In this embodiment, at least one of CORSET configuration and/or search space configuration for the type 1 UE specific SI message scheduling is different to that for the type 2 UE SI message scheduling.

In an embodiment, the type 1 specific SIB1 and/or SI message and type 2 UE specific SIB1 and/or SI message may be combined.

In an embodiment, the SI for type 1 UE is composed with two parts P1 and P2. In this embodiment, the part P1 is corresponding to a type 1 UE specific SIB1 and/or SIB. Note that, the type 1 UE specific SIB1 and/or SIB contains configurations for the type 1 UE. In addition, the part P2 is contained (e.g. included or comprised) in the SIB1 and/or SIB applicable to both the type 1 UE and the type 2 UE.

In an embodiment, the parts P1 and P2 may be scheduled independently by different PDCCH occasions or by DCI scrambled with different SI-RNTIs.

In an embodiment, the type 1 UE acquires both the parts P1 and P2 to acquire the complete SI. For example, the type 1 UE may acquire the SIB1 comprising the part P1 and the SIB1 comprising the part P2 and combine the parts P1 and P2 to acquire the complete SIB1 specific for the type 1 UE.

In an embodiment, an indication of whether a cell supports type 1 UE (access) may be needed.

In an embodiment, the indication of whether the cell supports the type 1 UE access is transmitted via the MIB. For example, whether the cell supports the type 1 UE access may be indicated by including a corresponding indicator in the MIB of the cell.

In an embodiment, if a cell supports the type 1 UE access, the BS may transmit the type 1 UE specific SIB1 in this cell. Thus, in an embodiment, the indicator in the MIB indicates whether type 1 UE specific SI is transmitted in the cell.

In an embodiment of an NR system, the indicator in the MIB indicates whether a PDCCH occasion configuration specific for the type 1 UE specific SIB1 scheduling is configured in the cell.

As a result, the type 1 UE is indicated whether the cell support the type 1 UE by reading the MIB of the cell.

In an embodiment, the indication of whether the cell supports the type 1 UE access is in the DCI which is transmitted on PDCCH occasions.

In an embodiment, the indication in the DCI is used to indicate whether the type 1 UE specific SIB1 is transmitted in the cell.

In an embodiment, the indication may be an indicator contained in the DCI.

In an embodiment, the indication may be implemented by setting special value to the scheduling parameter, .e.g., empty scheduling parameter, or a specific value of scheduling parameter.

In an embodiment, the PDCCH occasions used to transmit the DCI may be the PDCCH occasions configured in the MIB.

In an embodiment, the PDCCH occasions are used to transmit the DCI which schedules the type 1 UE specific SIB1 when the type 1 UE specific SIB1 is configured. In this embodiment, the BS may transmit the DCI once every N said PDCCH occasions (e.g. in every N-th said PDCCH occasions), where N is an integer specified by specification or signaled in the MIB.

In an embodiment, the PDCCH occasions are used to transmit DCI which schedules the type 2 UE specific SIB1.

In an embodiment, the PDCCH occasions are used to transmit DCI which schedules the SIB1 for both the type 1 UE and the type 2 UE.

In an embodiment, the indication of whether the cell supports the type 1 UE access is transmitted via a specific physic signal.

In an embodiment, the indication indicates whether the cell supports the type 1 UE access by transmitting the specific physical layer signal in the cell.

In an embodiment, the physical layer signal is transmitted periodically.

In an embodiment, the physical layer signal is transmitted in a cell if the cell supports the type 1 UE access. In an embodiment, the physical layer signal is transmitted in a cell if the cell does not support the type 1 UE.

In an embodiment, the physical layer signal is transmitted with predefined time/frequency radio resources.

In an embodiment, the predefined time/frequency radio resources are configured explicitly or implicitly via the MIB of the cell, or specified by specification.

In an embodiment, an indication of whether the SI is changed over an SI validity time may be needed.

In an embodiment, a BS may indicate whether the SIB1 and/or SI message of a cell is changed at least over the SI validity time by an indicator in the MIB. If a UE has a stored SI which is acquired no earlier than SI validity time ago and the MIB indicates the SIB1 and/or SI message is not changed, the UE regards the stored SI as valid. That is, the UE does not need to update the SI from the cell.

In an embodiment, a BS may include a value tag in the MIB or the SIB1, to indicate a version of current SI. A UE is able to determine whether SI is changed by comparing the value tag of its stored SI and the value tag contained in the current MIB or the SIB1 and decides whether to update the SI.

By adopting the indication of whether the SI is changed, the UE does not need to update the SI when it powers on or moves back to the cell from another cell and the system information of the cell is not changed.

In an embodiment, the indication of whether the SI is changed (over the SI validity time) is transmitted in the DCI scheduling the SIB1.

In an embodiment, the DCI scheduling SIB1 includes an indicator (e.g. the indicator IND2) to indicate whether system information is changed. For example, the indicator may indicate one of following:
 1. Whether SIB1 and SI message is changed
 2. Whether SIB1 is changed
 3. Whether SI message is changed.

In an embodiment, the indicator may indicate whether SI is changed for the type 1 UE. In an embodiment, the indicator may indicate whether system information is changed for the type 2 UE and the type 1 UE respectively. For example, the indicator may comprise one bit indicating whether the type 1 UE specific SI is changed and another one bit indicating whether the type 2 UE SI is changed. In an embodiment, the indicator may indicate whether system information is changed for both the type 2 UE and the type 1 UE.

In an embodiment, the indicator may indicate whether the SI is changed over at least SI validity time, e.g. 3 hours.

In an embodiment, the DCI may be used to schedule the type 2 UE SIB1.

In an embodiment, the DCI may be used to schedule the type 1 UE specific SIB1.

In an embodiment, the DCI may be used to schedule the SIB1 for both the type 2 UE and the type 1 UE.

In an embodiment, when the indicator indicates that the type 2 UE SI is changed, the type 2 UE acquires the SIB1.

In an embodiment, when the indicator indicates that type 2 UE SI is changed, the type 1 UE acquires SIB1. In this embodiment, at least part of the type 2 UE system information is also applied to the type 1 UE. In this embodiment, the SIB1 may be the type 2 UE specific SIB1.

In an embodiment, when the indicator indicates that type 1 UE specific SI is changed, the type 1 UE acquires the SIB1. In this embodiment, the SIB1 may be the type 2 UE specific SIB1 if at least part of the type 2 UE specific SI is applicable to the type 1 UE. In this embodiment, the SIB 1 may be the type 1 UE specific SIB1.

In an embodiment, the indication of whether the SI is changed (over the SI validity time) comprises an SI value tag and/or is transmitted in the DCI scheduling the SIB1.

In an embodiment, a system information value tag is included in the DCI scheduling the SIB1.

In an embodiment, the value tag may be one of following:
 1. The value tag of the type 2 UE specific SI,
 2. The value tag of the type 1 UE specific SI, and
 3. The value tag for both the type 2 UE specific SI and the type 1 UE specific SI.

In an embodiment, the DCI may be used to schedule the type 2 UE specific SIB1.

In an embodiment, the DCI may be used to schedule the type 1 UE specific SIB1.

In an embodiment, the DCI may be used to schedule SIB1 for both the type 2 UE and the type 1 UE.

In an embodiment, when the value tag in the DCI is for the type 2 UE and the value tag in he DCI is different to the UE stored value tag, the type 2 UE may acquire SIB1.

In an embodiment, when the value tag in the DCI is for the type 2 UE or for both the type 2 UE and the type 1 UE and the value tag in the DCI is different to the UE stored value tag, the type 1 UE may acquire the SIB1. In this embodiment, at least part of the type 2 UE SI may be also applicable to the type 1 UE. In this embodiment, the SIB1 may be the type 2 UE specific SIB1.

In an embodiment, when the value tag in the DCI is for the type 1 UE or for both the type 2 UE and the type 1 UE and the value tag is different to the UE stored value tag, the type 1 UE may acquire the SIB1. In this embodiment, the SIB1 may be the type 2 UE specific SIB1 when at least part of type 2 UE specific SI is applicable to type 1 UE. In this embodiment, the SIB1 may be the type 1 UE specific SIB1.

In the current NR specification, there are no enough spare bits in the MIB. Thus, it is difficult to contain an additional indicator or a value tag in the MIB. On the other side, the SIB1 may be dynamically scheduled, i.e. scheduled by the DCI transmitted on configured PDCCH occasions. Thus, indicating whether the SI is changed and/or including the SI value tag in the DCI used to schedule SIB1 is most beneficial for UE power efficiency. That is, the UE is indicated whether the SIB1 or SI message is changed before acquiring SIB1.

Further, aforementioned methods provided in this embodiment are applicable for various configurations of SI scheduling for type 1 UEs. The exemplified examples are illustrated as the following:

1. In an embodiment, the type 1 UE specific SIB1 and the type 2 UE specific SIB1 are independent to each other and are transmitted respectively.
2. In an embodiment, the type 1 UE and the type 2 UE share the same SIB1.
3. In an embodiment, the type 1 UE specific SIB1 is different to the type 2 UE specific SIB1 and at least part of the type 2 UE SIB1 content is applicable to the type 1 UE.

In an embodiment, a per SIB value tag (i.e. the value tag configured per SIB) may be considered for supporting the type 1 UE.

In an embodiment, the per SIB value tag is contained in the SIB1. The per SIB value tag is changed each time of its corresponding SIB1 is changed. The UE determines whether to update the SIB1 according to its stored per SIB value tag and the value tag contained in current broadcasting SIB1.

In an embodiment, a type 1 UE specific per SIB value tag is signaled to the type 1 UE, so as to support the type 1 UE.

In an embodiment, the type 1 UE specific per SIB value tag may be one of following:

1. The value tag of the type 1 UE specific SIB.

In this embodiment, the SIB other than SIB1 for the type 1 UE is different than that for the type 2 UE. The type 1 UE specific per SIB value tag is updated when the corresponding type 1 UE specific SIB is changed.

2. The value tag of the type 1 UE related SIB content.

In this embodiment, the type 1 UE specific per SIB value tag is updated when the content relevant to the type 1 UE in the corresponding SIB is changed. The content relevant to the type 1 UE may be included in an SIB applicable to both type 2 UE and type 1 UE, or may be included in an SIB dedicated to type 1 UE.

In an embodiment, type 1 UE specific per SIB value tag is included in an SIB1. In this embodiment, the SIB1 may be shared by both type 2 UE and type 1 UE, or the SIB1 is dedicated to type 1 UE.

Type 1 UE acquires an SIB when the corresponding per SIB value tag contained in current SIB1 is different to the corresponding value tag stored by UE. The SIB may be a type 1 UE specific SIB, or may be a type 2 UE and type 1 UE shared SIB (i.e. an SIB applicable to both the type 2 UE and the type 1 UE).

By adopting type 1 UE specific per SIB value tag the type 1 UE can be informed whether a specific SIB related to type 1 UE is changed. The SIB may be a type 1 UE specific SIB or an SIB applicable to both type 2 UE and type 1 UE.

In an embodiment, a change notification indicating the SI is to be changed may be considered for supporting type 1 UE.

In an embodiment, an SI change notification may be used to notify a UE when SI is to be changed in next SI modification period. The UE acquires the SI in the next SI modification period if the SI change notification is notified.

In an embodiment, the SI change notification is implemented by including an indicator in at least one of a paging message, DCI which is used to scheduling a paging message or DCI scrambled with a paging-RNTI, P-RNTI.

In an embodiment, the SI change notification comprises an indicator in a paging message or DCI which is used to schedule a paging message, to indicate whether the type 1 UE related SI is to be changed.

In an embodiment, the type 1 UE related SI may be one of following:

1. The type 1 UE specific SI, and
2. The SI applicable to both the type 2 UE and the type 1 UE.

In an embodiment, a type 1 UE may acquire type 1 UE related SI when the indicator in the paging message or the DCI scheduling the paging message indicates that type 1 UE related SI is changed.

By adopting the SI change notification, a type 1 UE is notified when type 1 UE related SI is to be changed. The SI may be type 1 UE specific SIB, or the SIB applicable to both type 2 UE and type 1 UE.

In an embodiment, a type 1 UE specific area may be considered for supporting the type 1 UE.

In an embodiment, a concept of an SI area is introduced by containing an SI area identification (ID) in the SIB1. When the UE moves to a new cell which has same SI area ID as previously used cell and an SIB's value tag is the same as that of the previously used cell, the UE regards the SIB valid in the new cell.

In an embodiment, a type 1 UE specific SI area ID is included in an SIB, .e.g., the SIB1. The SIB may be dedicated for the type 1 UE or applicable for both type 2 UE and type 1 UE.

In an embodiment, type 1 UE specific SI area ID indicates a valid area of the SI related to type 1 UE.

In an embodiment, a type 1 UE regards a stored SIB as valid in a new cell when the type 1 UE specific SI area ID and the SIB's value tag are the same as the cell from where the UE acquires the SIB.

In an embodiment, the SIB may be type 1 UE specific SIB or the SIB applicable to both type 2 UE and type 1 UE.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless network node, the wireless communication method comprising:
 transmitting a specific information associated with system information (SI) related to a first wireless terminal type in a cell,
 wherein the specific information comprises a first indicator indicating whether the cell supports the first wireless terminal type by indicating whether a configuration dedicated for the first wireless terminal type is configured in the cell,
 wherein a capability of downlink (DL) bandwidth of the first wireless terminal type is smaller than a capability of DL bandwidth of a second wireless terminal type,
 wherein the SI related to the first wireless terminal type comprises a first instance different from a second instance of SI related to the second wireless terminal type, and
 wherein the first wireless terminal type refers to reduced capability terminals and the second wireless terminal type refers to non-reduced capability terminals.

2. The wireless communication method of claim 1, wherein the SI comprises SI block 1 (SIB1).

3. A wireless communication method for use in a wireless terminal, the wireless communication method comprising:
 receiving a specific information associated with system information (SI) related to a first wireless terminal type in a cell,
 wherein the specific information comprises a first indicator indicating whether the cell supports the first wireless terminal type by indicating whether a configuration dedicated for the first wireless terminal type is configured in the cell,
 wherein a capability of downlink (DL) bandwidth of the first wireless terminal type is smaller than a capability of DL bandwidth of a second wireless terminal type,
 wherein the SI related to the first wireless terminal type comprises a first instance different from a second instance of SI related to the second wireless terminal type, and
 wherein the first wireless terminal type refers to reduced capability terminals and the second wireless terminal type refers to non-reduced capability terminals.

4. The wireless communication method of claim 3, wherein the SI comprises SI block 1 (SIB1).

5. A wireless network node, comprising:
 a communication unit, configured to transmit a specific information associated with system information (SI) related to a first wireless terminal type in a cell,
 wherein the specific information comprises a first indicator indicating whether the cell supports the first wireless terminal type by indicating whether a configuration dedicated for the first wireless terminal type is configured in the cell,
 wherein a capability of downlink (DL) bandwidth of the first wireless terminal type is smaller than a capability of DL bandwidth of a second wireless terminal type,
 wherein the SI related to the first wireless terminal type comprises a first instance different from a second instance of SI related to the second wireless terminal type, and
 wherein the first wireless terminal type refers to reduced capability terminals and the second wireless terminal type refers to non-reduced capability terminals.

6. The wireless network node of claim 5, wherein the SI comprises SI block 1 (SIB1).

7. A wireless terminal, comprising:
 a communication unit, configured to receive a specific information associated with system information (SI) related to a first wireless terminal type in a cell,
 wherein the specific information comprises a first indicator indicating whether the cell supports the first wireless terminal type by indicating whether a configuration dedicated for the first wireless terminal type is configured in the cell,
 wherein a capability of downlink (DL) bandwidth of the first wireless terminal type is smaller than a capability of DL bandwidth of a second wireless terminal type,
 wherein the SI related to the first wireless terminal type comprises a first instance different from a second instance of SI related to the second wireless terminal type, and
 wherein the first wireless terminal type refers to reduced capability terminals and the second wireless terminal type refers to non-reduced capability terminals.

8. The wireless terminal of claim 7, wherein the SI comprises SI block 1 (SIB1).

* * * * *